(12) United States Patent
Kearney et al.

(10) Patent No.: US 7,652,618 B2
(45) Date of Patent: Jan. 26, 2010

(54) METHOD AND SYSTEM FOR DETERMINING VELOCITY BY USING VARIABLE OR DISTINCT SAMPLING RATES

(75) Inventors: John R. Kearney, Charlotte, NC (US); Jason J. Wanner, West Fargo, ND (US)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 12/165,772

(22) Filed: Jul. 1, 2008

(65) Prior Publication Data

US 2009/0207069 A1     Aug. 20, 2009

Related U.S. Application Data

(60) Provisional application No. 61/029,148, filed on Feb. 15, 2008.

(51) Int. Cl.
   *G01S 13/58* (2006.01)
(52) U.S. Cl. .................. 342/104; 342/115; 342/106; 342/116; 342/196
(58) Field of Classification Search ............... 342/104, 342/106, 115, 116, 192, 196
   See application file for complete search history.

(56) References Cited

U.S. PATENT DOCUMENTS

| | | | |
|---|---|---|---|
| 4,316,173 A | | 2/1982 | Matsumura et al. |
| 4,788,553 A | | 11/1988 | Phillips |
| 4,959,656 A | * | 9/1990 | Kumar ................. 342/418 |
| 5,302,956 A | | 4/1994 | Asbury et al. |
| 5,381,151 A | * | 1/1995 | Boles et al. ................ 342/21 |
| 5,430,450 A | | 7/1995 | Holmes |
| 5,517,196 A | | 5/1996 | Pakett et al. |

(Continued)

FOREIGN PATENT DOCUMENTS

DE     4007249     9/1991

(Continued)

OTHER PUBLICATIONS

Ashruf S. El-Dinary et al., Non-Recursive FM Demodulation of Laser Radar Backscatter Using Time-Frequency Distributions, Space Department, IEEE 1994, pp. 353-356.

(Continued)

*Primary Examiner*—John B Sotomayor

(57) ABSTRACT

A data processor applies transform processing to a first group of samples at a primary sampling rate, where the first group of samples is within a data window associated with at least one of the data blocks. A detector detects an estimated frequency shift between the transmitted signal and the reflected signal based on a primary peak frequency determined by the transform processing at the primary sampling rate. The data processor applies transform processing to a second group of samples at a secondary sampling rate, where the data window contains previously read samples and at least one new sample, if the estimated frequency shift falls within a target response frequency band. The detector detects an observed frequency shift between the transmitted signal and the reflected signal based on a secondary peak frequency determined by the transform processing at the secondary sampling rate. A velocity estimator for estimating a velocity of at least one of the object and the transmitter based on the estimated frequency shift, the observed frequency shift, or both.

20 Claims, 4 Drawing Sheets

U.S. PATENT DOCUMENTS

| | | | |
|---|---|---|---|
| 5,570,099 A * | 10/1996 | DesJardins | 342/378 |
| 5,625,362 A | 4/1997 | Richardson | |
| 5,638,305 A | 6/1997 | Kobayashi et al. | |
| 5,696,515 A | 12/1997 | Zyren et al. | |
| 5,731,778 A | 3/1998 | Nakatani et al. | |
| 5,761,383 A | 6/1998 | Engel et al. | |
| 5,912,822 A | 6/1999 | Davis et al. | |
| 6,014,595 A | 1/2000 | Kobayashi | |
| 6,091,355 A | 7/2000 | Cadotte, Jr. et al. | |
| 6,097,669 A | 8/2000 | Jordan et al. | |
| 6,101,882 A | 8/2000 | Tran et al. | |
| 6,335,701 B1 * | 1/2002 | Fujisaka et al. | 342/115 |
| 6,339,396 B1 * | 1/2002 | Mayersak | 342/357.05 |
| 6,369,700 B1 | 4/2002 | Yamada | |
| 6,415,133 B1 | 7/2002 | Brede et al. | |
| 6,583,754 B2 | 6/2003 | Mertins et al. | |
| 6,628,231 B2 * | 9/2003 | Mayersak | 342/357.05 |
| 6,795,012 B2 * | 9/2004 | Nakanishi et al. | 342/70 |
| 2003/0156057 A1 * | 8/2003 | Rohling et al. | 342/109 |
| 2009/0207069 A1 * | 8/2009 | Kearney et al. | 342/104 |

FOREIGN PATENT DOCUMENTS

| | | |
|---|---|---|
| DE | 4317832 | 5/1993 |
| JP | 06308230 A * | 11/1994 |

OTHER PUBLICATIONS

Cooley, J.W. et al., The Finite Fourier Transform, pp. 251-259, Reprinted from IEEE Trans. Audio Electroacoust, vol. AU-17, pp. 77-85, Jun. 1969.

Baumann, Claude, RFT: a simplified fast real-time sliding DFT algorithm, <URL: http://www.ultimaterobolab.com/pdfs/5_RFT.pdf>, Nov. 15, 2005.

* cited by examiner

US 7,652,618 B2

METHOD AND SYSTEM FOR DETERMINING VELOCITY BY USING VARIABLE OR DISTINCT SAMPLING RATES

This document (including all of the drawings) claims priority based on and the benefit of the filing date of U.S. provisional application No. 61/029,148, filed on Feb. 15, 2008, and entitled METHOD AND SYSTEM FOR DETERMINING VELOCITY BY USING VARIABLE OR DISTINCT SAMPLING RATES, under 35 U.S.C. 119(e).

FIELD OF THE INVENTION

This invention relates to a method and system for determining the velocity of an object or a vehicle by using variable sampling rates or distinct sampling rates.

BACKGROUND OF THE INVENTION

In existing radar systems, the velocity of an object or a vehicle may be determined based on a Doppler frequency shift in a received signal. The received signal may be down-converted in frequency, digitized by an analog-to-digital converter, and stored in a data buffer for subsequent processing. A data processor within the radar system may use a mathematical transform, such as a Fast Fourier transform to identify the frequency components of the digital representation of the received signal stored in the data buffer. For practical applications of the radar system, the data processor and associated processing of the mathematical transform need to be done in real time or with sufficient promptness to be useful.

To some extent, the data buffer may be increased in size to increase the responsiveness of the processing of the mathematical transform. However, if the data buffer size is increased beyond a certain limit, the data processor may have insufficient throughput or capacity to process all of the data in the data buffer in real time. In addition, as the data buffer is increased in size, power consumption also tends to increase. Thus, there is a need for improving the processing of the mathematical transform and improving the responsiveness of the determining a velocity of an object or a vehicle.

SUMMARY OF THE INVENTION

A method and system determines the velocity of an object or a vehicle. A transmitter (e.g., associated with a vehicle) transmits a signal from a transmitter toward an object or the ground. A receiver receives a reflected signal of the transmitted signal from the object or the ground. An organizer for organizes the reflected signal into data blocks containing samples. A data processor applies transform processing to a first group of the samples at a primary sampling rate, where the first group of samples is within a data window associated with at least one of the data blocks. An evaluator or frequency shift detector detects an estimated frequency shift between the transmitted signal and the reflected signal based on a primary peak frequency determined by the transform processing at the primary sampling rate. The data processor applies transform processing to a second group of samples at a secondary sampling rate, where the data window contains previously read samples and at least one new sample, if the estimated frequency shift falls within a target response frequency band. The second group of samples is within the data window and comprises a lesser number of samples than the first group. The evaluator or frequency shift detector detects an observed frequency shift between the transmitted signal and the reflected signal based on a secondary peak frequency determined by the transform processing at the secondary sampling rate. A velocity estimator estimates a velocity of at least one of the object and the vehicle based on the estimated frequency shift, the observed frequency shift, or both.

DESCRIPTION OF THE PREFERRED EMBODIMENT

Figure 1:
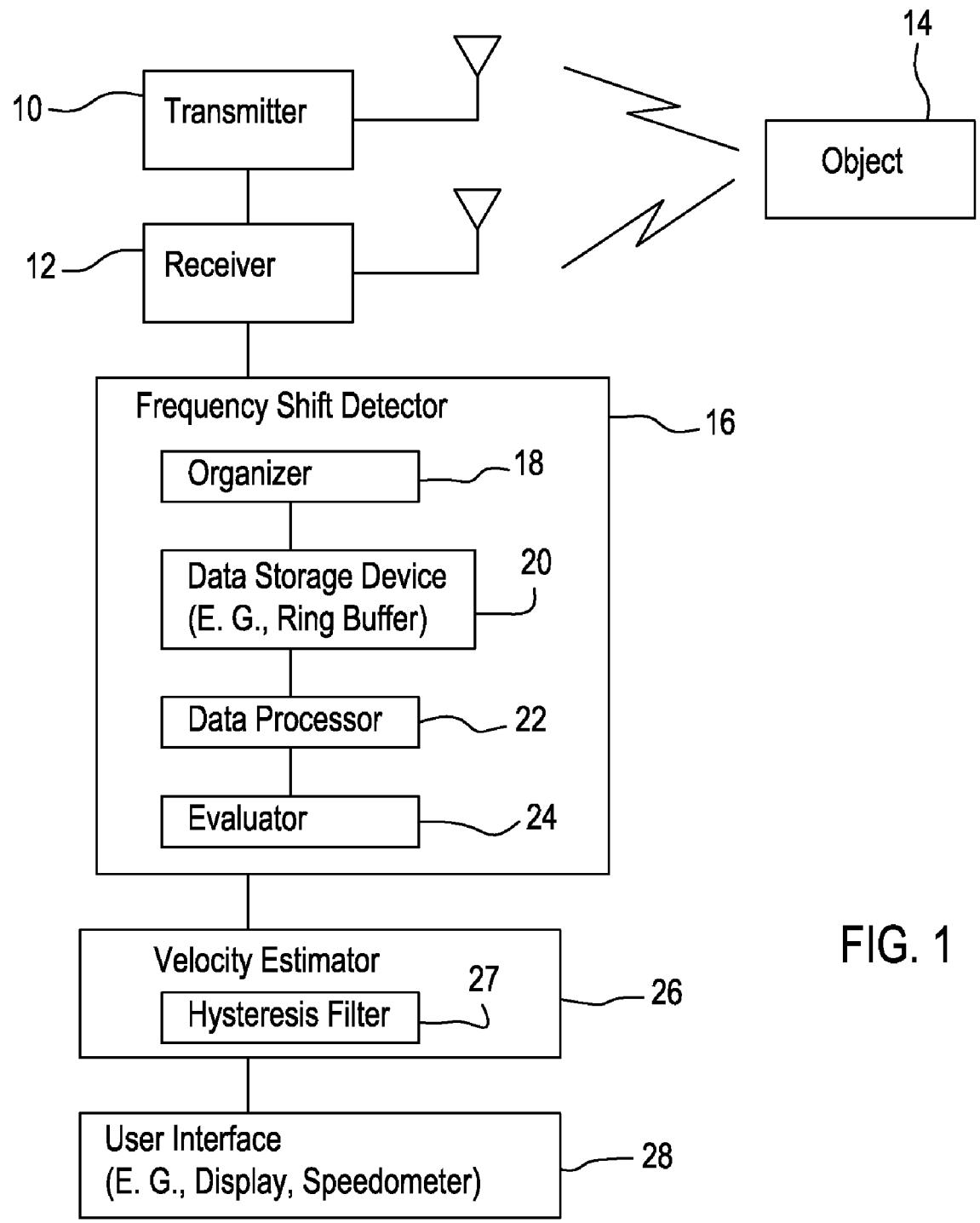
FIG. 1 is a block diagram of one embodiment of a system for determining the velocity of or a vehicle by using variable or distinct sampling rates inputted into a mathematical transform.

In accordance with FIG. 1, a velocity estimation system 11 comprises a transmitter 10 coupled to a receiver 12. In turn, the receiver 12 is coupled to a frequency shift detector 16.

In one embodiment, the frequency shift detector 16 comprises an organizer 18, a data storage device 20 (e.g., ring buffer), a data processor 22 and an evaluator 24. In FIG. 1, the lines interconnecting the foregoing elements of the frequency shift detector 16 may represent physical communication paths, logical communication paths, or both. A physical communication path may be embodied as a data bus or a transmission line; a logical communication path may be embodied as a channel or time slot on the data bus or transmission line or a communication (e.g., a call) between different modules or portions of software, for instance.

The frequency shift detector 16 is coupled to a velocity estimator 26, which includes a hysteresis filter 27. In turn, as shown in FIG. 1, the velocity estimator 26 is coupled to a user interface 28.

In one illustrative application, the velocity estimation system 11 may be mounted on or carried by a vehicle. Further, the velocity estimation system 11 may be configured to measure the speed or velocity of the vehicle with respect to a reference point on the ground or any other object 14 (e.g., obstacle) within range of the vehicle transmitter 10 and receiver 12.

The transmitter 10 is capable of transmitting an electromagnetic signal (e.g., an identifiable radio frequency or microwave pulse or a pulse train) from a transmitter 10 toward an object 14 or a fixed reference point on the ground. It is understood that the object 14 or ground is spatially separated from the transmitter 10. Further, the object 14 is preferably within the range of transmitted electromagnetic signal to produce a reflection or reflected, electromagnetic signal from the object 14. The transmitter 10 may transmit an identifiable pulse or a pulse train at a known transmission frequency or frequencies. The transmitter 10 may communicate with the receiver 12 to provide an enable signal, timing data, or code or modulation data on a transmission of an electromagnetic signal or pulse from the transmitter 10.

The receiver 12 is capable of receiving a reflected signal of the transmitted signal from the object 14 or the ground. In one configuration, the receiver 12 may comprise a down-converter and an analog-to-digital converter (A/D converter). For example, the down-converter may comprise a local oscillator (e.g., operating at a frequency of the transmitted signal or at an intermediate frequency lower than the transmitted frequency of the transmitted signal) and a mixer. In accordance with the configuration, the receiver 12 feeds the received, reflected signal (e.g., after amplification) and the output of the oscillator to different mixer inputs of the mixer. The analog-to-digital converter (A/D converter) is coupled to the mixer output of the mixer to facilitate the provision of a digital signal representation of the reflected signal for further processing (e.g., by the frequency shift detector 16).

In another configuration, the receiver 12 may further comprise a timer that establishes a maximum duration between the transmission of a transmitted signal and the reception of the reflected signal, based on any known or independently established information about the relative distance between the object 14 and the transmitter 10 or velocity detection system. The timer may be associated with a filter in the receiver 12 that rejects reflected signals that fall outside of the maximum duration or another filter time window that is based on the total propagation time of the signals (e.g., pulse) between the transmitter 10 and the object 14 and between the receiver 12 and the object 14.

The frequency shift detector 16 comprises an organizer 18 for organizing the reflected signal into data blocks containing samples. In one configuration, each of the data blocks has at least one data block pointer. For example, the organizer 18 may assign a header block pointer, a tail block pointer, or both to each data block. If each data block is of a known or uniform size, both the header block pointer and the tail block pointer may not be needed because the demarcations between data blocks (e.g., the end or beginning of each data block) may be determined or indexed based on the address of the data block pointer and the known uniform size of the data block.

The data storage device 20 generally comprises data memory, latches, random access memory, dynamic random access memory, non-volatile memory, flash memory, electronic memory, optical memory, electromagnetic memory or another storage device for storing data. The data storage device 20 holds or stores the organized data blocks, which contain samples.

In one example, the data storage device 20 may comprise a ring buffer. The ring buffer may be arranged as registers or storage locations in which initial data blocks may be shifted over from one memory location to the next in a sequence or in a ring, such that refreshed memory blocks are rotated around the ring buffer. Further, the ring buffer may support shifting or movement of one or more data blocks around the ring buffer, or overwriting of one or more data blocks within the ring buffer on a first-in, first-out (FIFO) basis.

The ring buffer may be read at one or more nodes. In one embodiment, the ring buffer 20 is configured to support simultaneous reading at multiple nodes or within multiple data blocks to support simultaneous, near simultaneous or alternate processing of the data transforms (e.g., Fast Fourier transforms) at one or more sampling rates by the data processor 24. One or more ring pointers are arranged to address different samples or groups of samples, at distinct or variable sampling rates, independent of the data block pointer. Each ring pointer facilitates access to data storage segments within the data block samples of the received, reflected signal.

In one embodiment, the data processor 24 comprises a digital signal processor (DSP), a microprocessor, a microcontroller, a logic circuit, a dual-core microprocessor, a parallel processing system, an application specific integrated circuit (ASIC), or other device or system for processing data or for performing Boolean logical functions, transforms (e.g., mathematical transforms), or arithmetic functions. The data processor 24 detects a frequency shift (e.g., Doppler frequency shift) between the transmitted signal and the reflected signal based on a peak frequency determined by transform processing of samples or groups of samples in the data storage device 20. The transform may be selected from any of the following: a Fourier transform, a Fast Fourier transform, a Discrete-time Fourier transform, a Continuous Fourier transform, a Laplace transform, a Mellin transform, a Z-transform, or variants or modifications of any of the foregoing transforms. The Fourier transform is essentially a frequency-domain representation of a time-domain mathematical expression, which may support more efficient analysis of certain electromagnetic signals (e.g., to determine the dominant frequency components of a received electromagnetic signal).

The Fast Fourier transform may refer to an algorithm (e.g., recursive algorithm that is applied to distinct subdivisions of an original larger transform) that supports efficient calculation of the Discrete Fourier Transform. The Fast Fourier transform may be subdivided into two components for processing if the number of samples (to be processed) is divisible by a divisor of two. Alternatively, the Fast Fourier transform may be subdivided into a prime number of transforms (e.g., for parallel or serial processing) if the total number of samples is divisible by the prime number as the divisor. The appropriate divisor depends upon the number of samples within the group of samples to be processed and the construct for application of the transform, for instance.

Similar to the Fast Fourier transform, a Laplace transform is a linear transformation function that transforms time-domain representation to a frequency-domain representation. The Mellin and Z-transform may be defined as special cases of the more general Laplace transform, for example.

In one embodiment, the evaluator 24 or frequency shift detector 16 evaluates the results of the transform (e.g., Fast Fourier transform) in the frequency domain representation to identify the Doppler shift (e.g., detected frequency shift or observed frequency shift) in the received signal that is reflected from the object or ground. For instance, the frequency domain representation may be graphically modeled or visualized as a frequency versus amplitude graph of the received signal for multiple frequency components of the signal. The evaluator 24 may identify the frequency component with the greatest amplitude or magnitude as the primary peak frequency or the second peak frequency. In an alternate embodiment, the frequency domain representation may be represented by a group of mathematical equations, functions, an array, a table, a database, or otherwise.

Based on the detected frequency shift or observed frequency shift (or both), a velocity estimator 26 estimates a velocity of one or more of the following: the velocity estimation system 11, the transmitter 10, the receiver 12, the object 14, or a vehicle that carries the velocity estimation system 11, the transmitter 10 or the receiver 12. The velocity estimator 26 may use an equation, a mathematical expression, a graphical expression, a look-up table or another representation that defines a relationship between the frequency shift (e.g., detected frequency shift or observed frequency shift) and the velocity of the object 14. In one embodiment, the velocity estimator 26 uses a detected frequency shift to retrieve a corresponding entry of velocity from a look-up table, database or other data record.

As shown in FIG. 1, the velocity estimator 26 further comprises a hysteresis filter 27 for filtering to promote stability in the estimated velocity and to prevent oscillation between the first estimated velocity and a second estimated velocity of the vehicle, where the first estimated velocity is associated with a corresponding primary peak frequency at the primary sampling rate and where the second estimated velocity is associated with a secondary peak frequency at the secondary sampling rate. In one embodiment, the hysteresis filter 27 introduces a lag prior to permitting a transition between the first estimated velocity and the second estimated velocity (or between the estimated frequency shift and the observed frequency shift). In one embodiment, the lag may be proportional to a maximum acceleration or deceleration of a vehicle carrying the transmitter, whereas in other embodiments the lag may be a time period (e.g., one of several respective constant time periods) based on the corresponding last estimated velocity or an average, mean or mode of or historic velocities.

In another embodiment, the hysteresis filter 27 receives an input of actual acceleration of the vehicle based on a derivative of the estimated vehicle velocity from the velocity estimator 26 (e.g., immediately proceeding the evaluated time period) or an input from a separate accelerometer to facilitate in the selection of an appropriate lag amount from an equation, chart, look-up table or database that comprises a relationship between vehicle acceleration and the corresponding lag amount.

The user interface 28 may comprise a display, liquid crystal display, a speedometer, a group of light emitting diodes, or another visual or audible indicator of the velocity or speed of the velocity detection system 11.

In one example, velocity detection system 11 is located on a vehicle, whereas the object 14 is spatially separated from the vehicle. The transmitter 10 transmits an electromagnetic signal (e.g., a pulse or pulse train) toward one or more objects 14. In one embodiment, the ground or stationary object 14 may be selected as an object 14 to provide a ground speed or ground velocity of the transmitter 10 or a vehicle on which the transmitter 10 is located.

Figure 2:
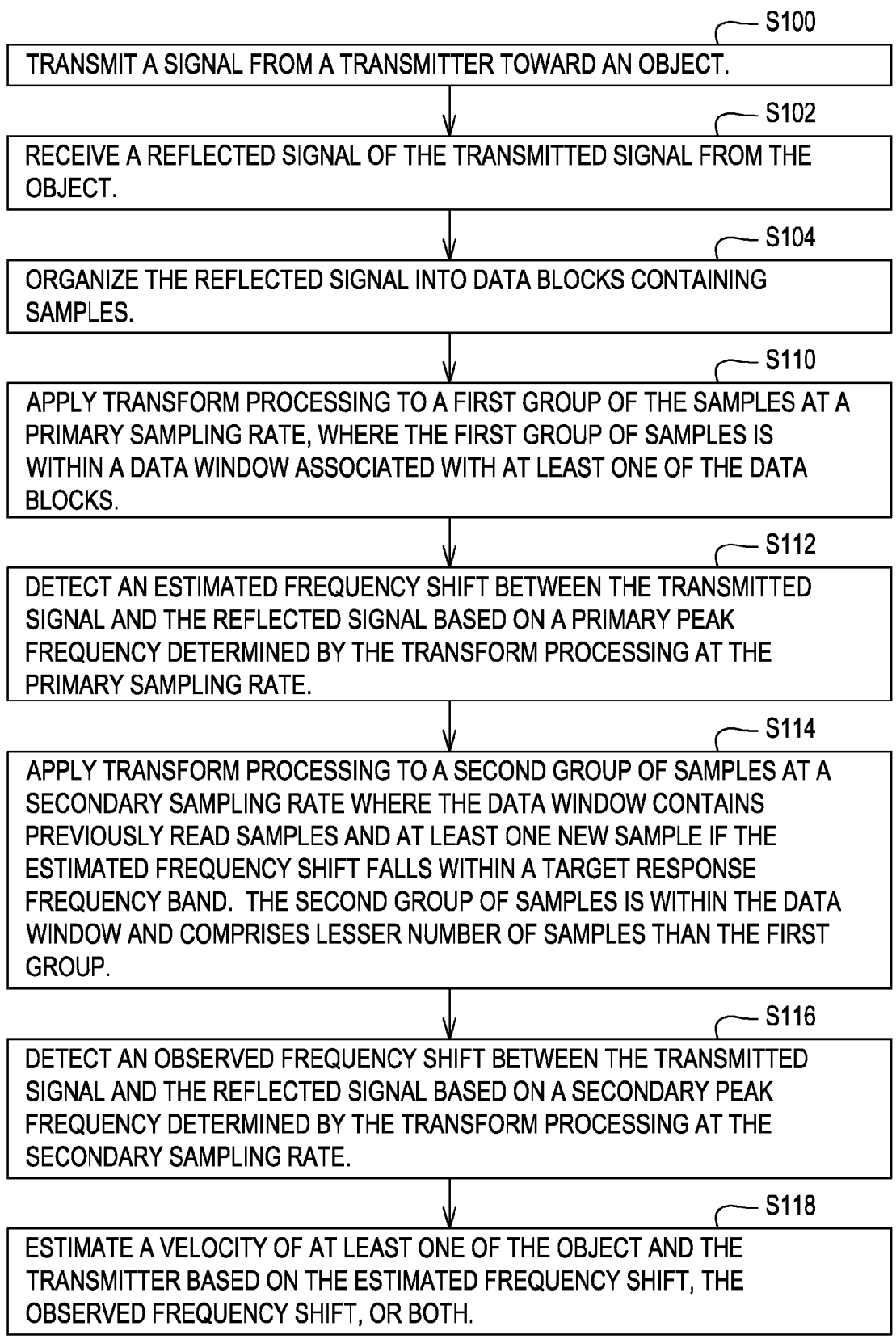
FIG. 2 is a flow chart of a method for determining the velocity of an object or vehicle by using variable or distinct sampling rates inputted into a mathematical transform.

FIG. 2 is a flow chart of a method for determining the velocity of an object 14 via a transform by using variable or distinct sampling rates. Here, in the illustrative example of FIG. 2, the variable or distinct sampling rates comprise the primary sampling rate and the secondary sampling rates, although other numbers of distinct sampling rates may be used in practice. The method of FIG. 2 begins with step S100.

In step S100, a transmitter 10 transmits a signal from a transmitter 10 toward an object 14 (e.g., a stationary obstacle, a moving obstacle, or a reference point on the ground). For example, the transmitter 10 transmits an electromagnetic pulse or pulse train toward the object 14 or ground with one or more known frequency components. The transmitter 10 may be mounted on or carried by a vehicle for estimating a velocity or speed of the vehicle with respect to the ground.

In step S102, a receiver 12 receives a reflected signal of the transmitted signal from the object 14 (e.g., a stationary obstacle, a moving obstacle, or a reference point on the ground). In one embodiment, if the receiver 12 comprises a down-converter, the down-converter down-converts the received signal to an intermediate frequency signal. Regardless of whether or not the receiver 12 includes a down-converter, an analog-to-digital converter converts the received, reflected signal or a derivative signal thereof to a digital signal representation. The derivative signal means a down-converted signal, an intermediate frequency signal, or the result of mixing the received, reflected signal with a local oscillator signal of a desired frequency (e.g., less than, equal to, or greater than the frequency of the received signal).

In step S104, an organizer 18 organizes the reflected signal into data blocks containing samples. For example, the organizer 18 organizes the reflected signals into data blocks for storage in the data storage device 20 (e.g., ring buffer). In one embodiment, each of the data blocks has at least one data block pointer. The data block pointer indicates a beginning or end of a data block, or a corresponding beginning address or ending address of the data block. In one embodiment, the data block pointer comprises a head pointer, a tail pointer, or both. If the data blocks are stored in a circular ring buffer as the data storage device 20, a ring pointer may be used to address, retrieve, access or process samples (or groups of samples) within the data blocks independently of one or more data block pointers and at variable or distinct sampling rates.

In step S110, a data processor 22 applies transform processing to a first group of the samples at a primary sampling rate. The first group of samples is within a data window associated with at least one of the data blocks. The data window generally comprises one or more of the following: data word, a group of symbols, a group of bits, a group of bytes, or an array of fixed length. For example, the data window may be a digital representation that expresses a time domain representation (e.g., of a known duration) of the received, reflected signal, or a derivative thereof.

The transform (e.g., mathematical transform) may comprise one or more of the following: a Fourier transform, a Fast Fourier transform, a Discrete-time Fourier transform, a Continuous Fourier transform, a Laplace transform, a Mellin transform, and a Z-transform, or variants of modifications of any of the foregoing transforms. A frequency domain representation of the received, reflected signal results from applying the mathematical transform to the time domain representation of the received, reflected signal (or a digital representation thereof). This frequency domain representation supports determining of the peak or primary frequency components of the received, reflected signal. The peak frequency represents a frequency of maximum amplitude (e.g., in the frequency domain). Similarly, the primary frequency components refer to those frequency components with amplitudes that exceed a certain minimum threshold.

In one example for executing step S110, the primary sampling rate is at least approximately two times a maximum Doppler frequency shift that is associated with a maximum expected speed of an object or a vehicle. The sampling rate of at least two times the maximum Doppler frequency shift is consistent with the Nyquist criteria for digital sampling, for instance.

In step S112, an evaluator 24 or frequency shift detector 16 detects an estimated frequency shift between the transmitted signal and the reflected signal based on a primary peak frequency determined by the transform processing at the primary sampling rate. For example, the evaluator 24 or frequency shift detector 16 may detect or identify the received frequency component with the greatest magnitude or maximum amplitude as the estimated frequency shift. In step S112 or prior thereto, a filter (e.g., a low pass filter associated with a data output of the data processor 24) may be used to filter the peak frequency determined by the mathematical transform with a low pass filter to remove spurious data.

In step S114, the data processor 22 applies transform processing to a second group of samples at a secondary sampling rate, if the estimated frequency shift (e.g., of step S112) falls within a target response frequency band. However, if the estimated frequency shift (e.g., of step S112) falls outside of the target response frequency band, the transform processing at the secondary sampling rate may be halted for a time period or an interval, until the estimated frequency shift again falls within the target response frequency band. The estimated frequency shift may fall within the target response frequency band when the vehicle or object is moving at a velocity below a certain velocity threshold, for example.

In step S114, to the extent transform processing is applied, the data processor 22 generally applies transform processing to the second group of samples at the secondary sampling rate, where the data window contains previously read samples and at least one new sample. The second group of samples is within the data window and generally comprises a lesser number of samples per unit time than the first group. For example, the second group of samples may be reduced by a factor of N, if every Nth sample is applied to the transform processing.

In addition to deciding whether to engage in transform processing based on the target response frequency band, step S114 may be carried out in accordance with various procedures that may be applied separately or cumulatively. Under a first procedure, the previously read samples and the at least one new sample are distributed within at least two adjacent data blocks. For example, step S114 may apply transform processing to every Nth sample in the two adjacent data blocks, where N is any positive integer. The transform (e.g., mathematical transform) may comprise one or more of the following: a Fourier transform, a Fast Fourier transform, a Discrete-time Fourier transform, a Continuous Fourier transform, a Laplace transform, a Mellin transform, and a Z-transform, or variants of modifications of any of the foregoing transforms. In one embodiment, the sampling of every Nth sample may be implemented by a digital filter associated with or integral to the data processor 22.

Under a second procedure, N may increase with a corresponding decrease in the velocity of the object 14 or vehicle velocity estimated by the velocity estimation system 11. N may be varied in accordance with an equation that includes the velocity as a factor or in accordance with a look-up table, database or chart.

Under a third procedure, N is adjusted dynamically or on a regular basis based on a measured or estimated data input rate to the data processor 22 to provide a certain desired rate, target rate, or target range of data input to the data processor 22. In practice, where the system is used to measure vehicle speed, the rate of input to the data processor 22 may vary with changes in vehicle speed, such that N may be adjusted to compensate for changes in vehicle speed to maintain a certain desired rate, target rate, or target range of data input to the data processor 22. The desired rate or target rate of data input to the data processor 22 may depend upon specifications of the data processor, empirical measurements, performance tests, or field radar tests, for instance.

Under a fourth procedure for executing step S114, the secondary sampling rate is greater than the rate of availability of incoming received data for each complete data block (e.g., in step S104), where the rate of each complete data block depends on block aggregate delay. The block aggregate delay refers to one or more of the following delays: (1) reception (e.g., by the receiver 12) of the received signal containing information for an entire data block, (2) down-converting the received signal to baseband or an intermediate frequency, (3) digitizing (e.g., by the analog-to-digital (A/D) converter) of an entire data block, and (4) organizing, formatting, storage and/or writing of the entire data block into a data storage device 20.

Under the fourth procedure, the secondary sampling rate may be executed at a rate that is generally limited (e.g., to a maximum rate) by the rate of availability of the next sample within a data block, where each sample undergoes a sample aggregate delay. The sample aggregate delay refers to one or more of the following delays: (1) reception (e.g., by the receiver 12) of the received signal containing information for a set of one or more samples, (2) down-converting the received signal to baseband or an intermediate frequency, (3) digitizing (e.g., by the analog-to-digital (A/D) converter) of the set of one or more samples, and (4) organizing, formatting, storage and/or writing of the set of one or more samples into a data storage device 20. It should be appreciated that the sample aggregate delay is less than the block aggregate delay; hence, the secondary sampling rate is capable of exceeding the first sampling rate (e.g., particularly where N is equal to 1). Although the secondary sampling rate may be as great as that of the rate of sample availability for processing, the data processor 22 may not have sufficient throughput or processing capacity to complete a transform upon receipt of each new sample along with the residual or existing samples within the data window. Accordingly, in practice, the secondary sampling rate may be reduced such that (1) a group of new samples is processed or transformed (e.g., along with the residual samples), as opposed to a single new sample with the existing remaining samples within the data window, or (b) only every Nth sample within a data window is evaluated, where N is a positive integer and wherein N may be related to the expected Doppler frequency. The fourth procedure may be referred to as a sliding window or moving window approach because the data window captures data on a rolling first-in, first-out basis based on the rate of sample availability, as opposed to the rate of data block availability for processing. The fourth procedure is well suited for real-time processing of transforms for accurate, timely, responsive estimation of very low vehicle speeds or very low object speeds (e.g., approximately 0.4 Kilometers per hour).

Regardless of which of the above procedures is used or not, the estimated frequency shift resulting from the data processing or transform processing of steps S110 and S112 is generally used as an input to step S114. In a sense, the target response frequency band represents a demarcation between higher velocities of the object 14 or the vehicle and lower velocities of the object 14 or the vehicle. In one embodiment, the target response frequency band is associated with an estimated frequency shift that indicates the vehicle speed or velocity is less than a threshold vehicle speed (e.g., approximately 0.4 Kilometers per hour or less). The transform processing of S114 is generally invoked to provide responsiveness and accuracy for lower velocities of the object or lower vehicle speeds; specifically for very low vehicle speeds at or below approximately 0.4 Kilometers per hour. In contrast, the transform processing of S110 may be considered as general applicability, with limitations that affect timely performance at the aforementioned very low vehicle speeds.

In step S116, the evaluator 24 of frequency shift detector 16 detects an observed frequency shift between the transmitted signal and the reflected signal based on a secondary peak frequency determined by the transform processing at the secondary sampling rate. For example, the evaluator 24 may detect or identify the received frequency components with the greatest magnitude or maximum amplitude as the observed frequency shift. In step S116 or prior thereto, a filter (e.g., a low pass filter associated with a data output of the data processor 24) may be used to filter the peak frequency determined by the mathematical transform with a low pass filter to remove spurious data.

In step S118, a velocity estimator 26 estimates a velocity (e.g., resultant velocity) of at least one of the object and the transmitter based on the estimated frequency shift, the observed frequency shift, or both. Step S118 may be carried out in accordance with various techniques that may be applied alternatively and cumulatively. Under a first technique, the velocity estimator 26 or the hysteresis filter 27 applies hysteresis filtering to prevent oscillation between the estimated frequency shift and the observed frequency shift as the basis for the estimated velocity. Accordingly, the hysteresis filter 27 may introduce a lag prior to a permitting transition between the estimated frequency shift and the observed frequency shift. In one example, the lag is proportional to a maximum acceleration or deceleration of a vehicle carrying the transmitter and a last detected velocity of the vehicle Under a second technique, the estimated frequency shift and the observed frequency shift contribute to the estimated velocity, where the relative contributions are defined by dynamically alterable weights. Accordingly, the hysteresis filter 27 may introduce a lag prior to a transition between one set of weights and another set of weights that changes the relative contribution of the estimated frequency shift and observed frequency shift to the estimated velocity.

Under a third technique, the velocity estimator 26 or the hysteresis filter 27 applies hysteresis filtering to prevent oscillation between a first estimated velocity (associated with the estimated frequency shift) and a second estimated velocity (associated with the observed frequency shift) as components of the resultant velocity. Accordingly, the hysteresis filter 27 may introduce a lag prior to a permitting transition between the first estimated velocity and the second estimated velocity. In one example, the lag is proportional to a maximum acceleration or deceleration of a vehicle carrying the transmitter and a last detected velocity of the vehicle Under a fourth technique, a first estimated velocity (associated with the estimated frequency shift) and a second estimated velocity (associated with the observed frequency shift) contribute to the resultant estimated velocity, where the relative contributions are defined by dynamically alterable weights. Accordingly, the hysteresis filter 27 may introduce a lag prior to a transition between one set of weights and another set of weights that changes the relative contribution of the first estimated velocity and the second estimated velocity to the resultant estimated velocity.

Under a fifth technique, the velocity estimator 26 may provide a velocity output signal, in digital or analog format, or velocity output data that indicates a velocity of an object 14 or the vehicle. In one example, the velocity output signal or velocity output data may be provided as input to the user interface 28 for display to a user or to a vehicle controller 30 to control the velocity of the vehicle or other operational parameters of the vehicle.

Under a sixth technique, the velocity estimator 26 may use an equation, a mathematical expression, a graphical expression, a look-up table or another representation that defines a relationship between the frequency shift (e.g., the primary peak frequency and the secondary peak frequency) and the velocity of the object 14. In one embodiment, the velocity estimator 26 uses a detected frequency shift to retrieve a corresponding entry of velocity from a look-up table, database or other data record.

Under a seventh technique, the detected primary peak frequency, the secondary peak frequency or corresponding frequency components of the received, reflected signal may be compared to reference frequency components of the transmitted signal. Accordingly, the reference frequency components are stored in a look-up table, a database, data record, or in a data storage device associated with the velocity estimator 26. The differences or frequency shifts between the detected primary frequency components and the reference frequency components in the frequency domain (or in the time domain) may be used to estimate or determine the velocity of the object or of the velocity estimating system 11 itself, if the object 14 is stationary. Similarly, the differences or frequency shifts between the detected secondary frequency components and the reference frequency components in the frequency domain (or in the time domain) may be used to estimate or determine the velocity of the object or of the velocity estimating system 11.

Figure 3:
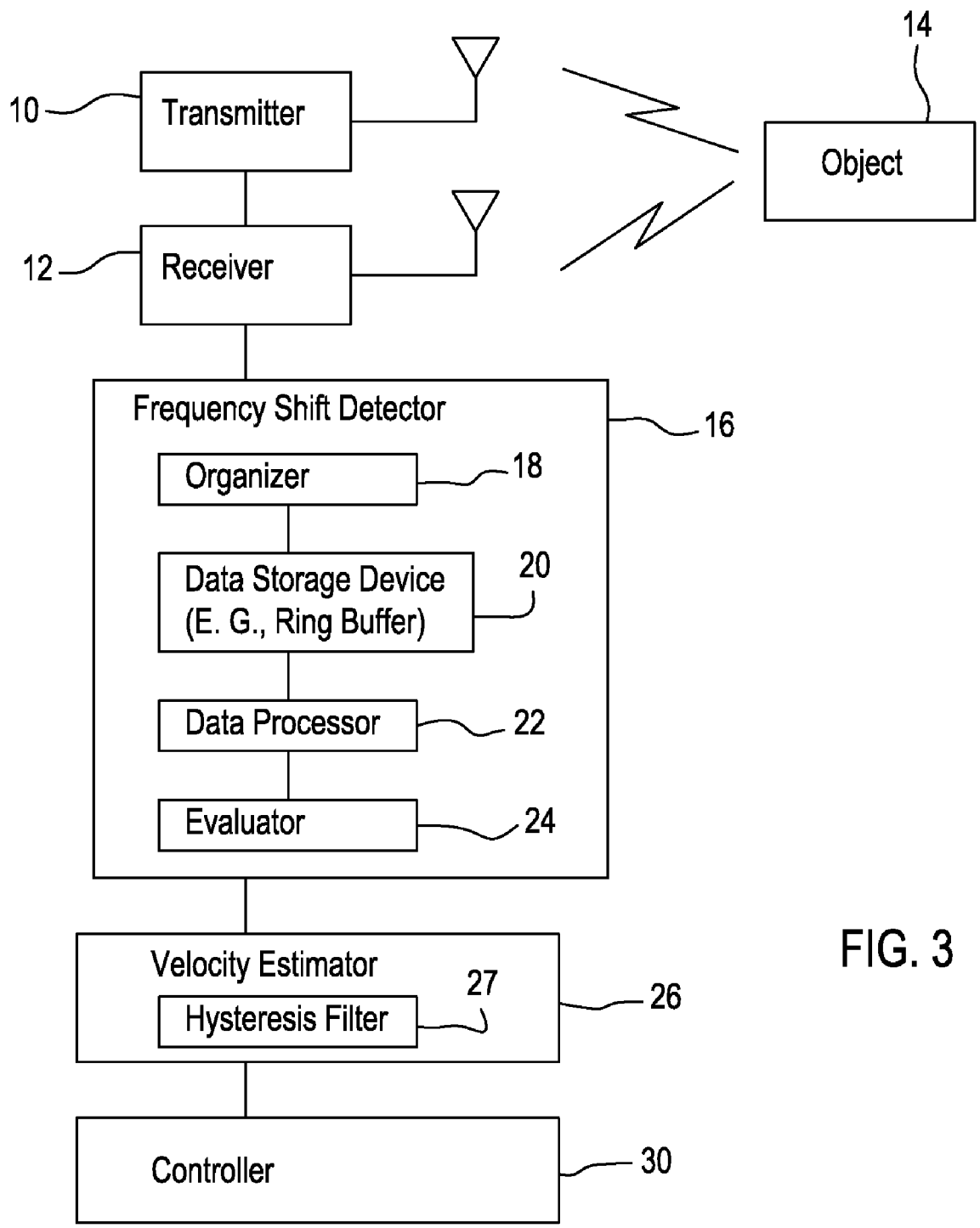
FIG. 3 is a block diagram of another embodiment of a system for determining the velocity of an object or a vehicle.

The velocity estimation system 111 of FIG. 3 is similar to the velocity estimation system 11 of FIG. 1, except the velocity estimation system 111 of FIG. 3 replaces the user interface 28 with a controller 30 (e.g., vehicle controller 30 or velocity controller). The velocity estimation system 11 of FIG. 1 is well suited for manned vehicles, whereas the velocity estimation system 11 of FIG. 3 may be applied to manned or unmanned vehicles (e.g., autonomous vehicles.)

The controller 30 may communicate with a fuel metering device (e.g., throttle controller or fuel injection system) of an internal combustion engine or a motor controller (e.g., inverter, chopper, or variable electrical energy supply) of a propulsion motor for a vehicle to maintain a desired velocity of the vehicle with respect to the ground in view of the velocity detected by the velocity estimation system. In one configuration, controller 30 may communicate with other controllers associated with the vehicle via a data bus (e.g., a CAN (Controller Area Network) data bus).

Figure 4:
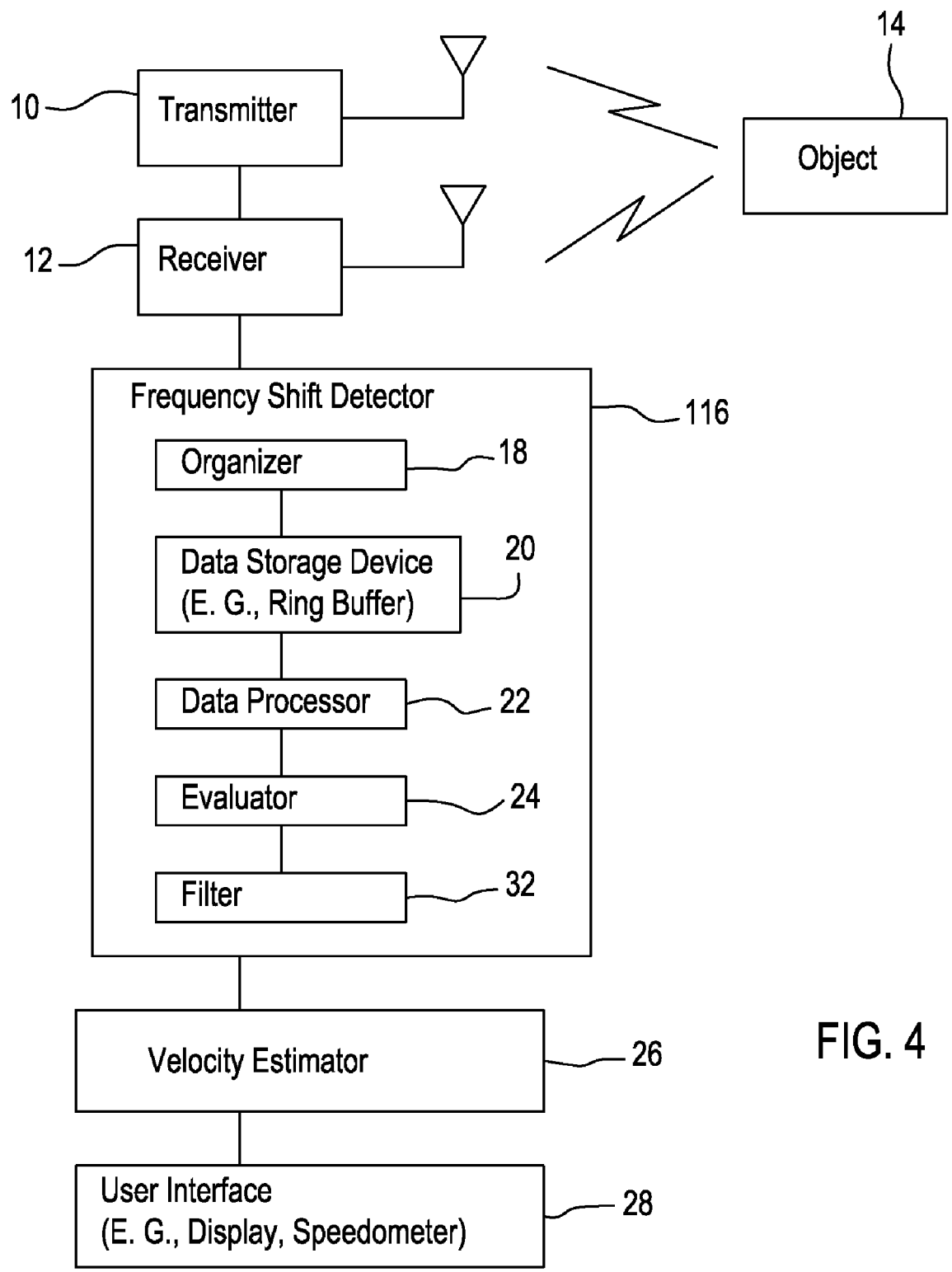
FIG. 4 is a block diagram of yet another embodiment of a system for determining the velocity of an object or a vehicle.

The velocity estimation system 211 of FIG. 4 is similar to the velocity estimation system 11 of FIG. 1, except the frequency shift detector 116 of FIG. 4 further includes a filter 32. The filter 32 (e.g., low pass filter) is associated with a data output of the data processor 24 or frequency shift detector 116, such that the filter rejects or attenuates certain low frequency components in the frequency domain representation of the received, reflected signal or otherwise. In one embodiment, the filter output of the filter 32 may be coupled to the velocity estimator 26. In another embodiment, the filter output of the filter 32 may be routed to or communicated to the evaluator 24.

Having described the preferred embodiment, it will become apparent that various modifications can be made without departing from the scope of the invention as defined in the accompanying claims.

We claim the following:

1. A method for determining the velocity of a transmitter or an object, the method comprising:

transmitting a signal from a transmitter toward an object;

receiving a reflected signal of the transmitted signal from the object;

organizing the reflected signal into data blocks containing samples;

applying transform processing to a first group of the samples at a primary sampling rate, the first group of samples being within a data window associated with at least one of the data blocks;

detecting an estimated frequency shift between the transmitted signal and the reflected signal based on a primary peak frequency determined by the transform processing at the primary sampling rate;

applying transform processing to a second group of samples at a secondary sampling rate where the data window contains previously read samples and at least one new sample if the estimated frequency shift falls within a target response frequency band, the second group of samples being within the data window and comprising a lesser number of samples than the first group;

detecting an observed frequency shift between the transmitted signal and the reflected signal based on a secondary peak frequency determined by the transform processing at the secondary sampling rate; and estimating a velocity of at least one of the object and the transmitter based on the estimated frequency shift, the observed frequency shift, or both.

2. The method according to claim 1 wherein the previously read samples and the at least one new sample are distributed within at least two of the data blocks.

3. The method according to claim 1 wherein the transmitter is carried by a vehicle and wherein target response frequency band is associated with an estimated frequency shift indicates that a vehicle speed is less than a threshold vehicle speed.

4. The method according to claim 1 wherein the primary sampling rate is at least approximately two times the maximum Doppler frequency that is associated with a maximum expected speed of an object or a vehicle.

5. The method according to claim 1 wherein the secondary sampling rate is greater than once per data block duration for storage, writing or collection of the data block into a data storage device.

6. The method according to claim 1 wherein:
placing the data block samples into a circular ring buffer, each of the data blocks having at least one data block pointer; and
creating a ring pointer to at least one of the data block samples, the ring pointer independent of the data block pointer.

7. The method according to claim 1 wherein the transform is selected from the group consisting of a Fourier transform, a Fast Fourier transform, a Discrete-time Fourier transform, a Continuous Fourier transform, a Laplace transform, a Mellin transform, and a Z-transform.

8. The method according to claim 1 further comprising:
filtering the peak frequency determined by the transform with a low pass filter to remove spurious data.

9. The method according to claim 1 wherein the estimating of the velocity comprises applying a hysteresis filtering to prevent oscillation between the estimated frequency shift or selection of the observed frequency shift as the basis for estimated velocity, the hysteresis filtering introducing a lag prior to a transition between the estimated frequency shift and the observed frequency shift that is proportional to a maximum acceleration or deceleration of a vehicle carrying the transmitter.

10. The method according to claim 1 wherein the receiving further comprises:
down-converting the received signal to an intermediate frequency signal; and
converting the intermediate frequency signal to a digital signal representation for the data block samples.

11. A system for determining the velocity of a transmitter or an object, the system comprising:
a transmitter for transmitting a signal from a transmitter toward an object;
a receiver for receiving a reflected signal of the transmitted signal from the object;
an organizer for organizing the reflected signal into data blocks containing samples;
a data processor for applying transform processing to a first group of the samples at a primary sampling rate, the first group of samples being within a data window associated with at least one of the data blocks; the data processor arranged to perform transform processing to a second group of samples at a secondary sampling rate where the data window contains previously read samples and at least one new sample if the estimated frequency shift falls within a target response frequency band, the second group of samples being within the data window and comprising a lesser number of samples than the first group;
a detector for detecting an estimated frequency shift between the transmitted signal and the reflected signal based on a primary peak frequency determined by the transform processing at the primary sampling rate; the detector arranged for detecting an observed frequency shift between the transmitted signal and the reflected signal based on a secondary peak frequency determined by the transform processing at the secondary sampling rate; and
a velocity estimator for estimating a velocity of at least one of the object and the transmitter based on the estimated frequency shift, the observed frequency shift, or both.

12. The system according to claim 11 wherein the previously read samples and the at least one new sample are distributed within at least two of the data blocks.

13. The system according to claim 11 wherein the transmitter is carried by a vehicle, the target response frequency band being associated with an estimated frequency shift indicating that a vehicle speed is less than a threshold vehicle speed.

14. The system according to claim 11 wherein the primary sampling rate is at least approximately two times the maximum Doppler frequency that is associated with a maximum expected speed of an object or a vehicle.

15. The system according to claim 11 wherein the secondary sampling rate is greater than once per data block duration for storage, writing or collection of the data block into a data storage device.

16. The system according to claim 11 wherein:
a circular ring buffer for storing the data block samples, each of the data blocks having at least one data block pointer; and
a ring pointer pointing to at least one of the data block samples, the ring pointer independent of the data block pointer.

17. The system according to claim 11 wherein the transform is selected from the group consisting of a Fourier transform, a Fast Fourier transform, a Discrete-time Fourier transform, a Continuous Fourier transform, a Laplace transform, a Mellin transform, and a Z-transform.

18. The system according to claim 11 further comprising:
a filter for filtering the peak frequency determined by the mathematical transform with a low pass filter to remove spurious data.

19. The system according to claim 11 wherein the receiver further comprises:
a down-converter for converting the received signal to an intermediate frequency signal; and
an analog-to-digital converter for converting the intermediate frequency signal to a digital signal representation for the data block samples.

20. The system according to claim 11 wherein the velocity estimator further comprises a hysteresis filter for filtering to prevent oscillation between the estimated frequency shift or selection of the observed frequency shift as the basis for estimated velocity, the hysteresis filter introducing a lag prior to a transition between the estimated frequency shift and the observed frequency shift that is proportional to a maximum acceleration or deceleration of a vehicle carrying the transmitter.

* * * * *